United States Patent
Shaga et al.

(10) Patent No.: US 11,221,236 B1
(45) Date of Patent: Jan. 11, 2022

(54) ANGULAR POSITION SENSOR AND ASSOCIATED METHOD OF USE

(71) Applicant: Microchip Technology Inc., Chandler, AZ (US)

(72) Inventors: Ganesh Shaga, Warangal (IN); Kevin Mark Smith, Jr., Dana Point, CA (US); Hwangsoo Choi, La Habra, CA (US); Sudheer Puttapudi, Hyderbad (IN)

(73) Assignee: Microchip Technology Inc., Chandler, AZ (US)

( * ) Notice: Subject to any disclaimer, the term of this patent is extended or adjusted under 35 U.S.C. 154(b) by 14 days.

(21) Appl. No.: 16/927,553

(22) Filed: Jul. 13, 2020

(51) Int. Cl.
*G01D 5/20* (2006.01)
(52) U.S. Cl.
CPC .................................. *G01D 5/2053* (2013.01)
(58) Field of Classification Search
None
See application file for complete search history.

(56) References Cited

U.S. PATENT DOCUMENTS

| | | | |
|---|---|---|---|
| 8,947,077 B2 | 2/2015 | Lee et al. | |
| 9,528,858 B2 | 12/2016 | Bertin | |
| 10,444,037 B2 | 10/2019 | Bertin | |
| 2008/0054887 A1 | 3/2008 | Lee | |
| 2018/0120083 A1* | 5/2018 | Reddy | G01B 7/30 |
| 2019/0017845 A1 | 1/2019 | Utermoehlen et al. | |
| 2019/0186891 A1 | 6/2019 | Utermoehlen et al. | |

FOREIGN PATENT DOCUMENTS

DE 102015220615 A1 4/2017

OTHER PUBLICATIONS

PCT/US21/12018, International Search Report and Written Opinion of the International Searching Authority, European Patent Office, dated Mar. 3, 2021.

* cited by examiner

*Primary Examiner* — Jas A Sanghera
(74) *Attorney, Agent, or Firm* — Glass and Associates; Kenneth Glass

(57) ABSTRACT

An angular position sensor comprising two planar excitation coils forming a substantially circular interior area and two planar sensing coils positioned within a minor sector of the substantially circular interior area. Each of the two planar sensing coils comprises a clockwise winding portion and a counter-clockwise winding portion. The angular position sensor further comprises a substantially circular rotatable inductive coupling element positioned in overlying relation to the two planar sensing coils and separated from the two planar sensing coils by an airgap, wherein the substantially circular rotatable inductive coupling element comprises three, substantially evenly space, sector apertures.

20 Claims, 8 Drawing Sheets

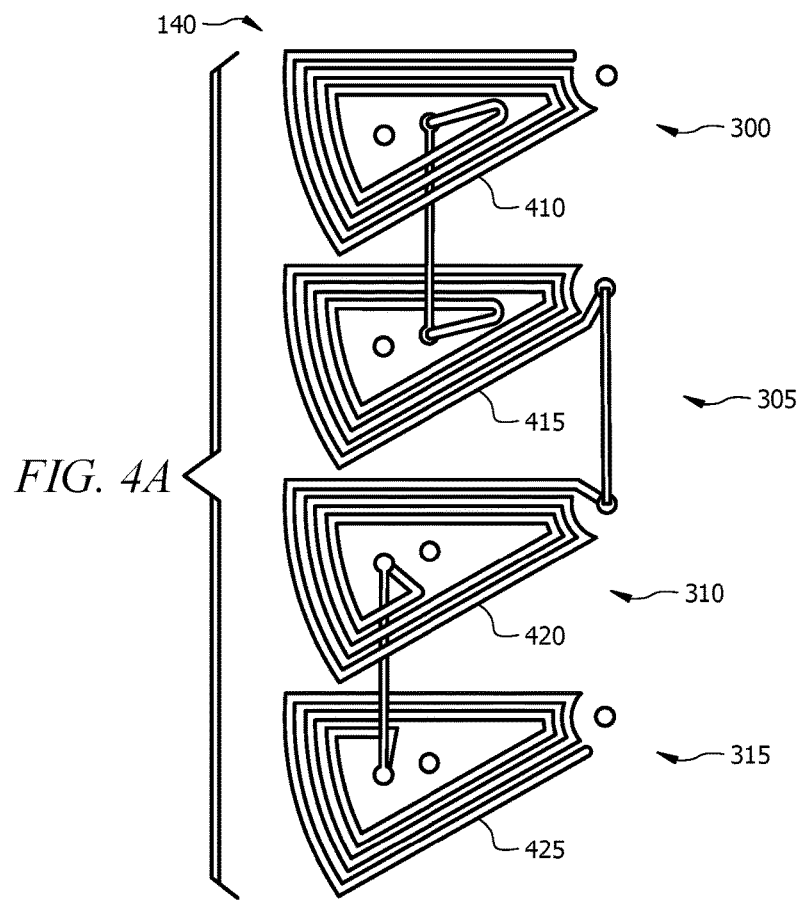
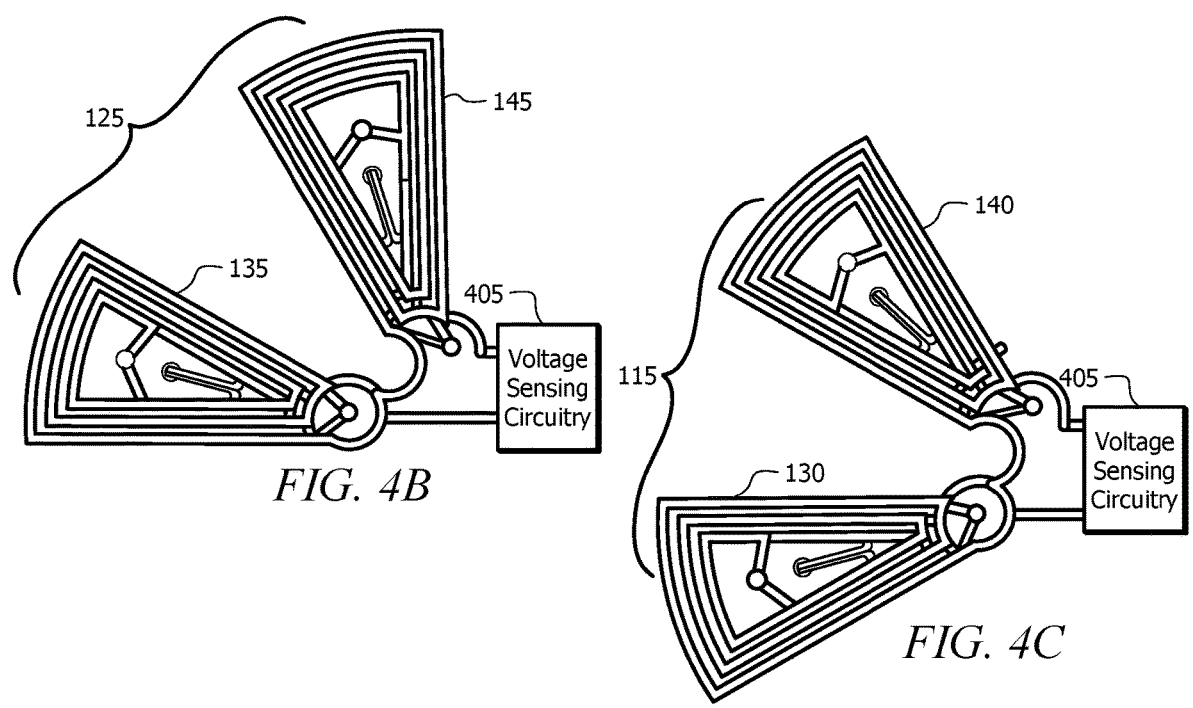

600 ⇢

| |
|---|
| ESTABLISHING A MAGNETIC COUPLING BETWEEN TWO PLANAR EXCITATION COILS AND TWO PLANAR SENSING COILS TO INDUCE A TIME VARYING VOLTAGE IN THE TWO PLANAR SENSING COILS, WHEREIN THE TWO PLANAR SENSING COILS ARE POSITIONED WITHIN A MINOR SECTOR OF A SUBSTANTIALLY CIRCULAR INTERIOR AREA FORMED BY THE TWO PLANAR EXCITATION COILS AND WHEREIN EACH OF THE TWO PLANAR SENSING COILS COMPRISES A CLOCKWISE WINDING PORTION POSITIONED OPPOSITE A COUNTER-CLOCKWISE WINDING PORTION — 605 |
| ↓ |
| POSITIONING A ROTATABLE INDUCTIVE COUPLING ELEMENT (OPT. NON-FERROMAGNETIC CONDUCTIVE MATERIAL) COMPRISING THREE SECTOR APERTURES THAT ARE SUBSTANTIALLY EVENLY SPACED ON THE CIRCULAR ROTATABLE INDUCTIVE COUPLING ELEMENT IN OVERLYING RELATION TO THE TWO PLANAR EXCITATION COILS AND SEPARATED FROM THE TWO PLANAR EXCITATION COILS BY AN AIR GAP, THE POSITION OF THE SECTOR APERTURES OF THE ROTATABLE INDUCTIVE COUPLING ELEMENT TO CAUSE A VARIATION IN A MAGNETIC COUPLING BETWEEN THE TWO PLANAR EXCITATION COILS AND THE WINDING PORTIONS OF EACH OF THE TWO PLANAR SENSING COILS — 610 |
| ↓ |
| MEASURING A TIME VARYING VOLTAGE INDUCED IN THE TWO PLANAR SENSING COILS AS A RESULT OF THE VARIATION IN THE MAGNETIC COUPLING — 615 |
| ↓ |
| DETERMINING A RATIO OF THE MEASURED TIME VARYING VOLTAGE OF EACH OF THE TWO PLANAR SENSING COILS TO DETERMINE THE ANGULAR POSITION OF THE ROTATABLE INDUCTIVE COUPLING ELEMENT RELATIVE TO THE POSITION OF THE TWO PLANAR SENSING COILS — 620 |

*FIG. 6*

ANGULAR POSITION SENSOR AND ASSOCIATED METHOD OF USE

BACKGROUND OF THE INVENTION

Numerous industries, including the automotive, industrial and aerospace industries, place stringent reliability requirements on their position sensing systems. Potentiometers are commonly known in the art for use in position sensing systems and are specifically used for determining displacement angles of motor controlled or regulated elements. Although potentiometers are a relatively inexpensive solution for position sensing, they are also susceptible to the effects of adverse environmental conditions and are subject to failure resulting from numerous operations, over time. To overcome the disadvantages of potentiometer-based sensing systems, non-contact position sensors are increasingly being used to meet the stringent reliability requirements. Non-contact position sensors are currently known in the art and may be based on various principles, including inductive, capacitive, Hall effect or magneto-resistive principles.

A non-contact sensor based on inductive principles in commonly known as an inductive position sensor, or a resolver. An inductive position sensor comprises a coil assembly having one or more excitation coils and two or more sensing coils. In the operation of an inductive position sensor, an alternating current (AC) is injected into the excitation coil(s) which results in the generation of a time varying magnetic field in the vicinity of the excitation coil. The time varying magnetic field is sufficient to induce a time varying voltage in the sensing coils as a result of the mutual magnetic coupling between the excitation coil and the sensing coils. To determine an angular position of a rotatable target with respect to the coil assembly, a conductive target is rotatably positioned within the time varying magnetic field between the excitation coil and the sensing coils and separated from the coils by an airgap. The presence of the rotatable target within the time varying magnetic field changes the mutual magnetic coupling between the excitation coil and the sensing coils, relative to the position of the rotatable target. The change in mutual coupling between the excitation coil and the sensing coils alters the time varying voltage induced in the sensing coils. Since the magnitude of the voltage change induced in the sensing coils is generally sinusoidal with respect to the angular position of the rotatable target relative to the coil assembly, the time varying voltage within the sensing coils can be measured and processed to determine the angular position of the rotatable target.

A coil assembly commonly used in conventional electromechanical resolvers is comprised of axial windings wound on a Ferro-magnetic core. However, this type of resolver assembly is expensive and consumes a considerable amount of space. In order to reduce the cost and size of resolvers, it is also known in the art to form planar coils on one or more printed circuit boards (PCB) to provide the coil assembly of the resolver. The present trend in position sensors based on planar coils has resulted in an increased demand for position sensors that are light weight, low cost and reliable and that also provide improved noise immunity. For example, there is increasing demand in the automobile industry for position sensors having a small form factor, such as 6 mm, 12 mm and 15 mm diameters. Additionally, there is a need in the art for a small form factor position sensor that meets airgap and accuracy requirements. However, the design of planar coil assemblies for inductive sensors currently known in the art do not meet the airgap, accuracy and form factor size requirements.

Accordingly, what is needed in the art is a non-contact angular position sensor utilizing a planar coil assembly implemented in a small form factor which meets airgap and sensing accuracy requirements.

SUMMARY OF THE INVENTION

In various embodiments, the present invention provides a system and method for sensing an angular position of a rotatable inductive coupling element. The system and method of the present invention provides an improved, non-contact, inductive, angular position sensor which provides for a reduced form factor while still meeting airgap and sensing. accuracy requirements.

In one embodiment, the present invention provides an angular position sensor including two planar excitation coils forming a substantially circular interior area. The angular position sensor further includes, two planar sensing coils positioned within a minor sector of the substantially circular interior area and each of the two planar sensing coils comprising a clockwise winding portion and a counter-clockwise winding portion. The angular position sensor additionally includes a substantially circular rotatable inductive coupling element positioned in overlying relation to the two planar sensing coils and separated from the two planar sensing coils by an airgap, wherein the substantially circular rotatable inductive coupling element comprises three sector apertures that are substantially evenly spaced on the circular rotatable inductive coupling element.

In a particular embodiment, the minor sector of the substantially circular interior area formed by the two planar excitation coils of the angular position sensor has a central angle of about 120° and each sector aperture of the substantially circular rotatable inductive coupling element has a central angle of about 30°. In this embodiment, each of the clockwise winding portion and the counter-clockwise winding portion of each of the two planar sensing coils are positioned within one of four equal subsectors of the minor sector of the substantially circular interior area and wherein each of the four equal subsectors of the minor sector has a central angle of about 30°.

In an additional embodiment, the present invention provides a method for sensing an angular position of a rotatable inductive coupling element, which includes, establishing a magnetic coupling between two planar excitation coils and two planar sensing coils to induce a time varying voltage in the two planar sensing coils, wherein the two planar sensing coils are positioned within a minor sector of a substantially circular interior area formed by the two planar excitation coils and wherein each of the two planar sensing coils comprises a clockwise winding portion positioned opposite a counter-clockwise winding portion. The method further includes, positioning a rotatable inductive coupling element comprising three sector apertures that are substantially evenly spaced on the circular rotatable inductive coupling element in overlying relation to the two planar excitation coils and separated from the two planar excitation coils by an airgap, the position of the rotatable inductive coupling element to cause a variation in a magnetic coupling between the two planar excitation coils and the winding portions of each of the two planar sensing coils. The method further includes, measuring a time varying voltage induced in the two planar sensing coils as a result of the variation in the magnetic coupling to determine an angular position of the rotatable inductive coupling element relative to the position of the two planar sensing coils.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 4A is a diagram illustrating the multilayer positioning of the winding layout of the counter-clockwise winding portion of one of the first planar sensing coils, in accordance with an embodiment of the present invention.

FIG. 4B is a diagram illustrating the clockwise and counter-clockwise winding turns of a first of the two planar sensing coils, in accordance with an embodiment of the present invention.

FIG. 4C is a diagram illustrating the clockwise and counter-clockwise winding turns of a second of the two planar sensing coils, in accordance with an embodiment of the present invention.

FIG. 6 is a flow diagram illustrating a method for sensing an angular position of a rotatable inductive coupling element, in accordance with an embodiment of the present invention.

DETAILED DESCRIPTION OF THE INVENTION

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, regions, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention provides an inductive angular position sensor having a planar coil assembly that is implemented on a multilayer layer printed circuit board (PCB). The coil patterns of the sensing coils and additional supporting circuitry are positioned within an interior of the excitation coils, thereby providing a reduced form factor. Additionally, the layout of the excitation coils provides improved sensing accuracy and the increased number of winding turns on the sensing coils allows for a larger airgap and increased sensing amplitude.

Figure 1:
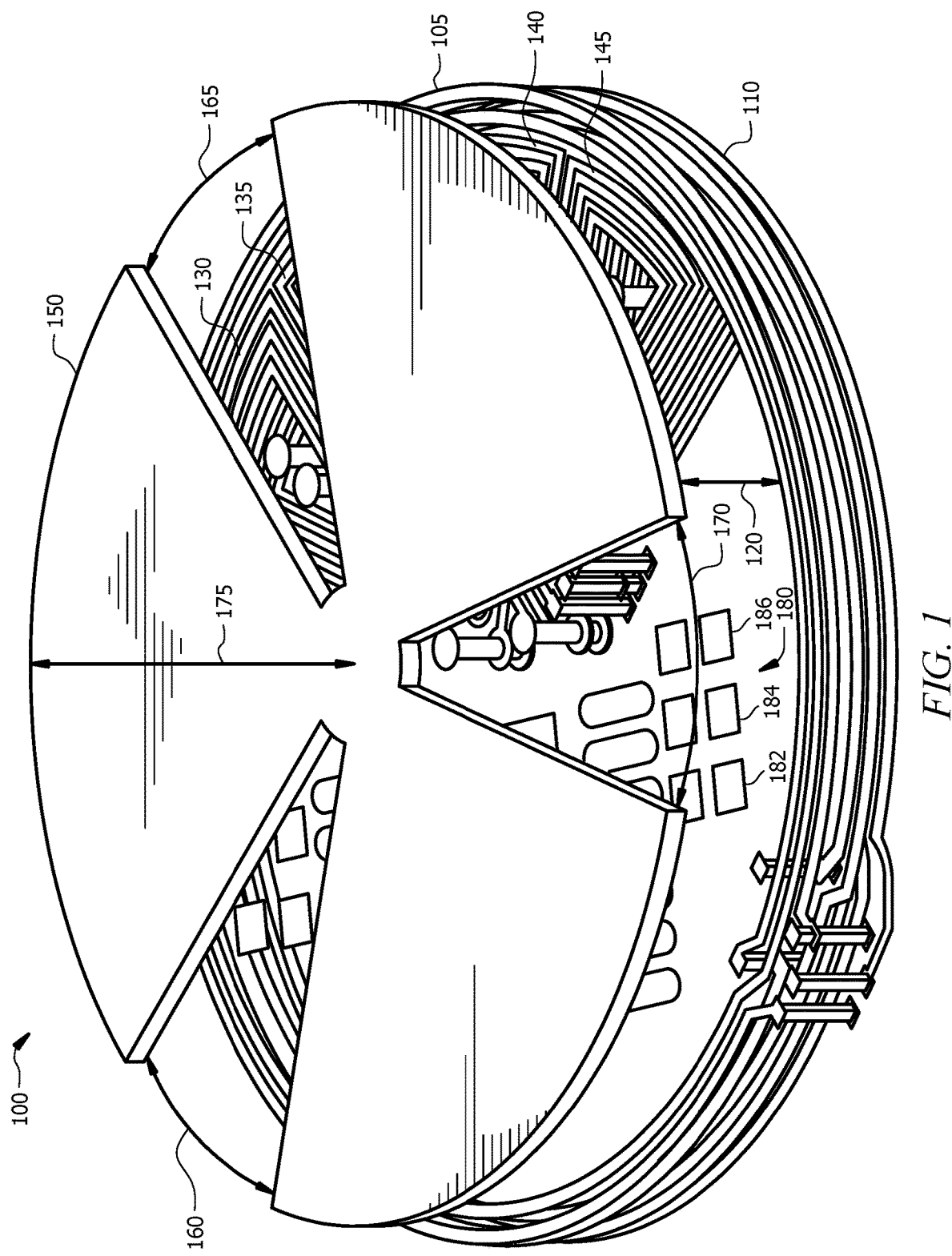
FIG. 1 is a diagram illustrating the angular position sensor, in accordance with an embodiment of the present invention.

With reference to FIG. 1, in one embodiment of the present invention, an angular position sensor 100 includes two planar excitation coils 105, 110, a first planar sensing coil comprising a clockwise winding portion 130 and a counter-clockwise winding portion 140 and a second planar sensing coil comprising a clockwise winding portion 135 and a counter-clockwise winding portion 145. The clockwise winding portions 130, 135 and counter-clockwise winding portions 140, 145 of the first and second planar sensing coils are positioned within a minor sector of an interior area formed by the two planar excitation coils 105, 110. In the present invention, a clockwise winding portion 130, 135 is defined as a winding portion wherein the direction of current flow through the winding portion is in a clockwise direction and a counter-clockwise winding portion 140, 145 is defined as a winding portion wherein the direction of current flow through the winding portion is in a counter-clockwise direction when the current through the clockwise winding portion 130, 135 is in the clockwise direction. Additional supporting circuitry 180 for the sensor 100 is positioned within a major sector of the interior of the two planar excitation coils 105, 110. The voltage sensing circuitry may be coupled to the winding portions 130, 135 and counter-clockwise winding portions 140, 145 of the first and second planar sensing coils, respectively, and is used to measure a time varying voltage induced in the first and second planar sensing coils. The supporting circuitry 180 may include one or more capacitors 182, 184, 186 and is positioned within the interior of the two planar excitation coils 105, 110, thereby reducing the overall PCB size.

The planar excitation coils 105, 110 and winding portions 130, 135, 140, 145 of the first and second planar sensing coils may include one or more winding turns, as shown in FIG. 1. The number of winding turns of the two planar excitation coils 105, 110 and the winding portions 130, 135, 140, 145 of the first and second planar sensing coils may be determined by the sensing voltage range required by the sensing circuit employing the position sensor 100. However, the number of winding turns of each of the winding portions 130, 135, 140, 145 of the first and second planar sensing coils should preferably be equal and the pattern formed by the winding portions 130, 135, 140, 145 should preferably be symmetrically placed within the minor sector of the circular interior area formed by the planar excitation coils 105, 110. As such, the number of winding turns of the clockwise winding portions 130, 135 of each of the first and second planar sensing coils, respectively, is preferably equal to a number of winding turns of the counter-clockwise winding portions 140, 145 of each of the first and second planar sensing coils, respectively. In the embodiment illustrated in FIG. 1, the winding portions 130, 135, 140, 145 of the first and second planar sensing coils are distributed symmetrically in a minor sector of a circular area formed by the two planar excitation coils 105, 110.

The position sensor 100 of the present invention additionally includes a substantially circular rotatable inductive coupling element 150 positioned in overlying relation to the winding portions 130, 135, 140, 145 of the first and second planar sensing coils and the two planar excitation coils 105, 110, as illustrated with reference to FIG. 1. The rotatable inductive coupling element 150 is a rotatable conductive disk having a radius 175 that is substantially equal to a radius of the interior area formed by the two planar excitation coils 105, 110. The rotatable inductive coupling element 150 may be fabricated of a non-ferromagnetic conductive material, including but not limited to, aluminum, brass, copper and stainless steel and other non-ferromagnetic conductive materials known in the art. In general, the rotatable inductive coupling element 150 may be fabricated of any material that is effective in changing the time varying voltage induced in the winding portions 130, 135, 140, 145 of the first and second planar sensing coils when it is placed in the time varying magnetic field in the vicinity of the two planar excitation coils 105, 110. The rotatable inductive coupling element 150 is positioned above the clockwise winding portions 130, 140 and the counter-clockwise winding portions 135, 145 of the first and second planar sensing coils and is separated from the first and second planar sensing coils by an airgap 120. As illustrated, the rotatable inductive coupling element 150 includes three sector apertures 160, 165, 170 that are substantially evenly spaced on the rotatable inductive coupling element 150.

Figure 2:
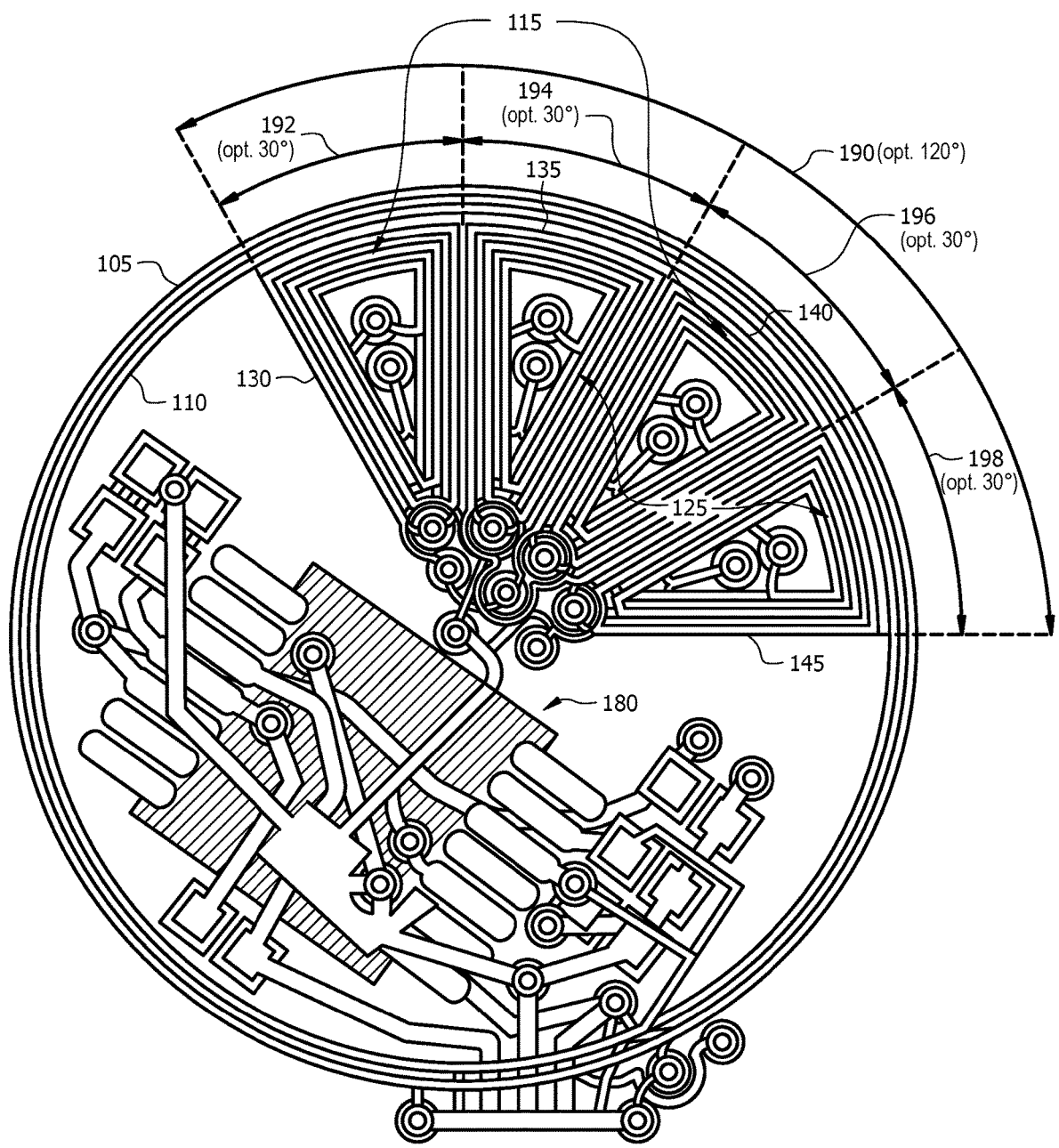
FIG. 2 is a diagram illustrating the design of the planar excitation coils and planar sensing coils of the angular position sensor, in accordance with an embodiment of the present invention.

FIG. 2 illustrates an exemplary layout of the two planar excitation coils 105, 110, first planar sensing coil 115, second planar sensing coil 125 and the additional circuitry 180 of the angular position sensor in additional detail, omitting the overlying rotatable inductive coupling element 150. As shown in FIG. 2, the first planar sensing coils 115 includes the clockwise winding portion 130 and the counter-clockwise winding portion 140 and the second planar sensing coils 125 includes the clockwise winding portion 135 and the counter-clockwise winding portion 145. The winding portions 130, 135, 140, 145 of the first and second sensing coils 115, 125 are positioned within a minor sector 190 of the circular interior area formed by the two planar excitation coils 105, 110. The supporting circuitry 180 is positioned within the remaining major sector of the circular interior area formed by the two planar excitation coils 105, 110.

As shown in FIG. 2, the minor sector 190 of the circular interior area is divided into four equal subsectors 192, 194, 196, 198 and each one of the winding portions 130, 135, 140, 145 of the respective first and second sensing coils 115, 125 are positioned in one of the four equal subsectors 192, 194, 196, 198. Referring again to FIG. 1, each of the three sector apertures 160, 165, 170 of the rotatable inductive coupling element 150 have dimensions substantially equal to one of the four equal subsectors 192, 194, 196, 198.

In the exemplary embodiment of FIG. 2, all four of the winding portions 130, 135, 140, 145 of the first and second sensing coils 115, 125 are positioned within a minor sector 190 having a central angle of about 120° and each of the individual winding portions 130, 135, 140, 145 of the first and second sensing coils 115, 125 are positioned within one of four equal subsectors 192, 194, 196, 198, each of the four equal subsectors of the minor sector having a central angle of about 30°. As shown, the clockwise winding portions 130, 135 and the counter-clockwise winding portions 140, 145 of the first and second planar sensing coils 115, 125, respectively, are positioned in alternating subsectors of the minor sector 190. For example, the clockwise winding portion 130 of the first planar sensing coil 115 is positioned in the first subsector 192, the clockwise winding portion 135 of the second planar sensing coil 125 is positioned in the second adjacent subsector 194, the counter-clockwise winding portion 140 of the first planar sensing coil 115 is positioned in the third adjacent subsector 196 and the counter-clockwise winding portion 145 of the second planar sensing coil 125 is positioned in the fourth adjacent subsector 198. Accordingly, the clockwise winding portion 130 of the first planar sensing coil 115 is separated from the counter-clockwise winding portion 140 of the first planar sensing coil 115 by the clockwise winding portion 135 of the second planar sensing coil 125 and the clockwise winding portion 135 of the second planar sensing coil 125 is separated from the counter-clockwise portion 145 of the second planar sensing coil 125 by the counter-clockwise winding portion 140 of the first planar sensing coil 115.

Referring again to FIG. 1 and with reference to FIG. 2, it follows that in the embodiment shown in FIG. 2, since each of the four equal subsectors 192, 194, 196, 198 has a central angle of about 30°, each sector aperture 160, 165, 170 of the rotatable inductive coupling element 150 also has a central angle of about 30°.

Figure 3A:
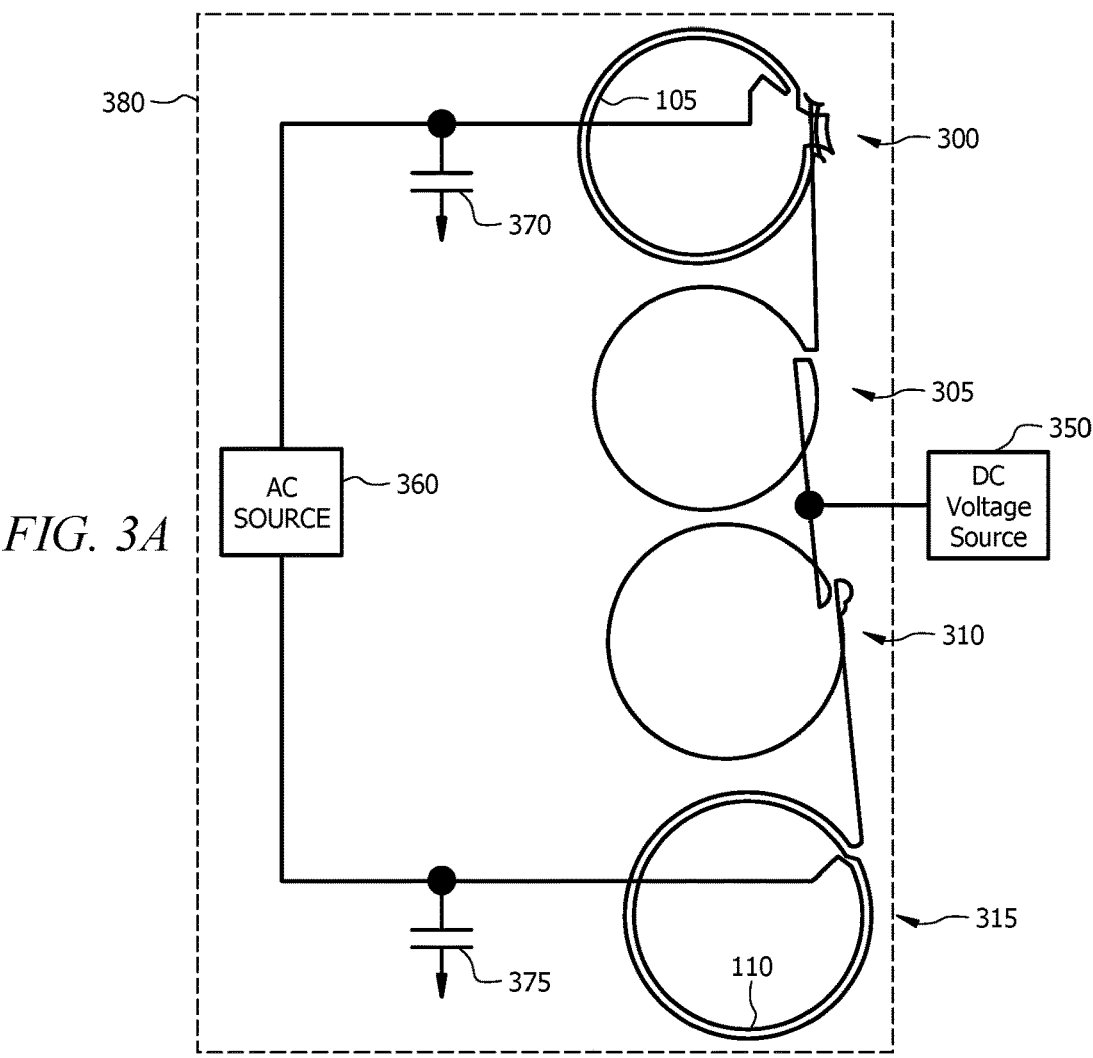
FIG. 3A is a diagram illustrating the multilayer positioning of the two planar excitation coils of the angular position sensor, in accordance with an embodiment of the present invention.
Figure 3B:
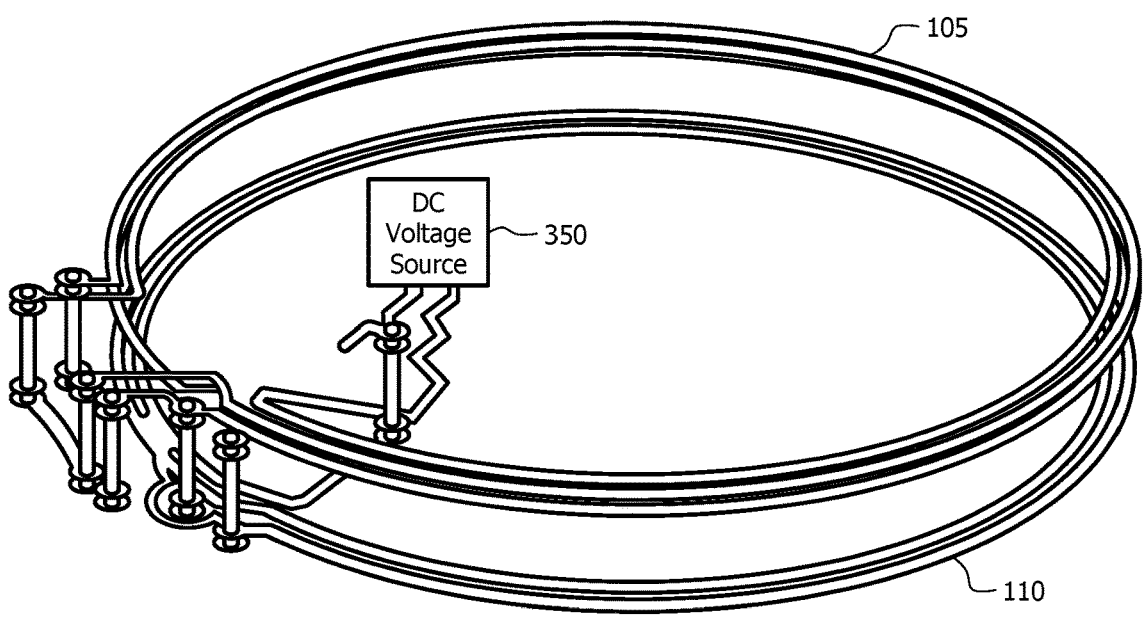
FIG. 3B is a diagram illustrating the relative positioning of the two planar excitation coils of the angular position sensor, in accordance with an embodiment of the present invention.

FIG. 3A and FIG. 3B further illustrate an exemplary layout of the two planar excitation coils 105, 110 of the angular position sensor 100. In various embodiments, the coils of the angular position sensor 100 of the present invention may be implemented on a multilayer substrate, such as a printed circuit board (PCB). Etching of printed circuit boards is commonly known in the art to form conductive traces having desired patterns on either single layer or multilayer substrates. In the illustrated embodiment, the windings of a first planar excitation coil 105 of the two planar excitation coils may be positioned on a first layer 300 and on a second layer 305 of the PCB substrate and the windings of a second planar excitation coil 110 of the two planar excitation coils may be positioned on a third layer 310 and on a fourth layer 315 of the PCB substrate. The windings on the various layers 300, 305, 310, 315 of the substrate are connected by vias, as is commonly known in the art. A DC voltage source 350 is coupled to the two planar excitation coils 105, 110 in a center tapped configuration to establish the magnetic field in the coils 105, 110. This positioning of the two planar excitation coils 105, 110 creates a substantially uniform magnetic field to achieve greater accuracy in the position sensor.

Additionally, as shown in FIG. 3A, each of the two planar excitation coils 105, 110 are coupled to an alternating current (AC) source 360. The AC source 360 may be any of the numerous AC current sources known in the art including, but not limited to, an oscillator circuit. In addition, the two planar excitation coils 105, 110 are each coupled to a capacitor 370, 375, respectively. The capacitors 370, 375 may be one of the capacitors 182, 184, 186 (not shown) positioned within the interior of the area formed by the two planar excitation coils 105, 110. The coupling of the planar excitation coils 105, 110 with the AC source 360 and the capacitors 370, 375 results in a cross-coupled resonant tank circuit 380. The differential operation inherent in cross-coupled resonant tank circuits results in an improved phase noise performance of the circuit.

FIG. 4A, FIG. 4B and FIG. 4C further illustrate the physical layout of the first and second planar sensing coils 115, 125 of the angular position sensor 100. FIG. 4A illustrates an exemplary winding layout of the counter-clockwise winding portion 140 of the first planar sensing coil 115. While the exemplary physical layout of the winding portions of the planar sensing coils 115, 125 is illustrated with reference to the counter-clockwise winding portion 140 of the first planar sensing coil 115, the description also applies to the other winding portions of the planar sensing coils 115, 125. As shown in FIG. 4A, a first set of winding turns 410 of the counter-clockwise winding portion 140 of the first planar sensing coil 115 may be positioned on the first, or top, layer 300 of a multilayer substrate and a second set of winding turns 415 of the counter-clockwise winding portion 140 of the first planar sensing coil 115 may be positioned on the second layer 305 of the multilayer substrate. Additionally, a third set of winding turns 420 of the counter-clockwise winding portion 140 of the first planar sensing coil 115 may be positioned on the third layer 310 of the multilayer substrate and the a fourth set of winding turns 425 of the counter-clockwise winding portion 140 of the first planar sensing coil 115 may be positioned on a fourth, or bottom, layer 315 of the multilayer substrate. As such, in this embodiment, each set of winding turns 410, 415, 420, 425 of the counter-clockwise winding portion 140 of the first planar sensing coil 115 is positioned on a different layer of the multilayer substrate. In an exemplary embodiment, the counter-clockwise winding portion 140 of the first planar sensing coil 115 may comprises 16 total winding turns and each set of winding turns 410, 415, 420, 425 may include 4 winding turns, wherein 4 winding turns of the counter-clockwise winding portion 140 are positioned on each of the 4 layers 300, 305, 310, 315 of the multilayer substrate. As shown in FIG. 4B and FIG. 4C, each of the first and second planar sensing coils 115, 125 are coupled to voltage sensing circuitry 405.

FIG. 4B illustrates a top view of the clockwise and counter-clockwise winding turns 135, 145 of the second planar sensing coil 125, as well as the connections to a voltage sensing circuitry 405. FIG. 4C illustrates a top view of the clockwise and counter-clockwise winding turns 130, 140 of the first planar sensing coil 115, as well as the connections to the voltage sensing circuitry 405.

In operation of the angular position sensor 100, when the two planar excitation coils 105, 110 are excited at the resonant frequency, a time varying magnetic field is established in the vicinity of the two planar excitation coils 105, 110 which induces a time varying voltage in the first and second planar sensing coils 115, 125. Since the direction of the current flowing in the winding directions of the winding portions of the first and second planar sensing coils 115, 125 are opposite to each other, a zero net voltage is induced in the first and second planar sensing coils 115, 125. The voltage sensing circuitry 405 senses and measures the time varying voltage in the first and second planar sensing coils 115, 125. The rotatable inductive coupling element 150, as shown in FIG. 1, is positioned in overlying relation to the two planar excitation coils 105, 115 and the first and second planar sensing coils 115, 125 and separated from them by the airgap 120. Depending upon the position of the three sector apertures 160, 165, 170 of the rotatable inductive coupling element 150 relative to the position of the winding portions 130, 135, 140, 145 of the first and second planar sensing coils 115, 125, one or more of the winding portions 130, 135, 140, 145 may be at least partially covered by one of the sector apertures 160, 165, 170 of the rotatable inductive coupling element 150 as the rotatable inductive coupling element 150 is rotated about its axis. Depending upon the position of the rotatable inductive coupling element 150 in relation to the winding portions 130, 135, 140, 145 of the first and second planar sensing coils 115, 125, and in particular the position of sector apertures 160, 165, 170, some of the winding portions of the first and second planar sensing coils 115, 125 will be at least partially covered by the overlying rotatable inductive coupling element 150 while other winding portions of the first and second planar sensing coils 115, 125 will be not be covered by the overlying rotatable inductive coupling element 150. As the rotatable inductive coupling element 150 is rotated, the sector apertures 160, 165, 170 will be positioned over different winding portions of the first and second planar sensing coils 115, 125. When the rotatable inductive coupling element 150 is positioned within the time varying magnetic field established between the two planar excitation coils 105, 110 and the first and second planar sensing coils 115, 125 of the angular position sensor 100, a change in the magnetic field results in the region where the winding portions 130, 135, 140, 145 are covered by the rotatable inductive coupling element 150. Positioning the rotatable inductive coupling element 150 within the magnetic field induces eddy currents in the rotatable inductive coupling element 150 which dampens the time varying magnetic field in the region of the winding portions 130, 135, 140, 145 covered by the rotatable inductive coupling element 150. As a result of the induction of eddy currents in the rotatable inductive coupling element 150, the time varying voltage induced in the windings portions of the first and second planar sensing coils 115, 125 covered by the rotatable inductive coupling element 150 are attenuated and the time varying voltage induced in the winding portions 130, 135, 140, 145 of the first and second planar sensing coils 115, 125 that are not covered by the rotatable inductive coupling element 150, i.e. those covered by one of the sector apertures 160, 165, 170, are not attenuated.

As illustrated in FIG. 5A-FIG. 5D, as the rotatable inductive coupling element 150 is rotated 90°, the magnitude of the time varying voltage induced in the winding portions 130, 135, 140, 145 of the first and second planar sensing coils 115, 125 changes based upon the position on the sector apertures 160, 165, 170 of the rotatable inductive coupling element 150 relative to the angular position sensor 100. While the following description assumes that one of the sector apertures 160, 165, 170 of the rotatable inductive coupling element 150 is positioned to be substantially aligned with one of the winding portions 130, 135, 140, 145 of the first and second planar sensing coils 115, 125, it is understood that one or more of the winding portions could be only partially covered by the rotatable inductive coupling element 150 due to the positioning of any one of the sector apertures 160, 165, 170 in relation to the winding portions 130, 135, 140, 145 of the first and second planar sensing coils 115, 125 as the rotatable inductive coupling element 150 is rotated.

Figure 5A:
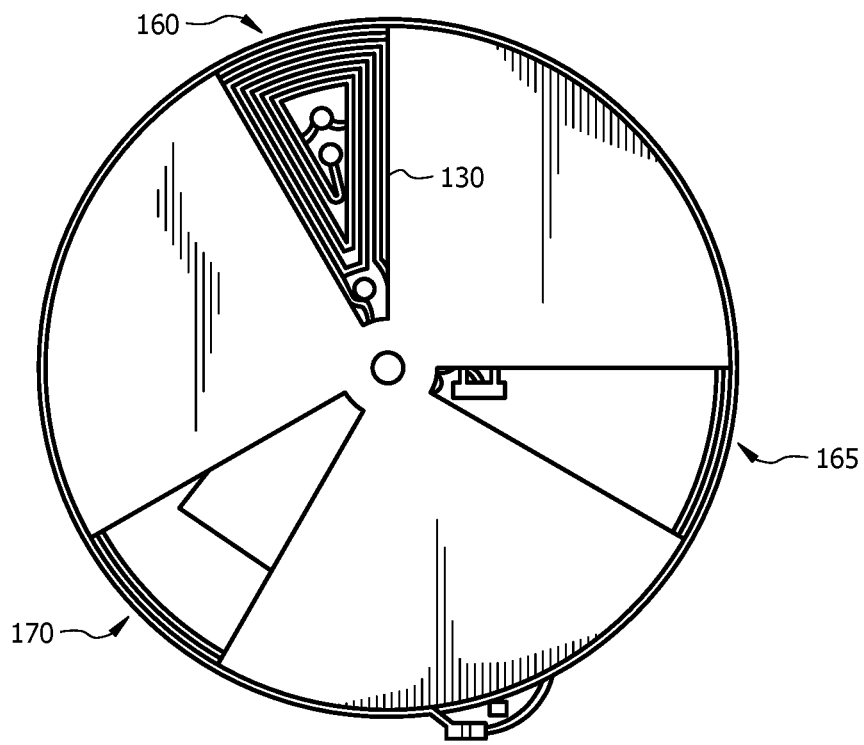
FIG. 5A is a diagram illustrating the angular position sensor at a 0° angular rotation position, in accordance with an embodiment of the present invention.

In FIG. 5A, when the rotatable inductive coupling element 150 is at a 0° position, a first sector aperture 160 of the rotatable inductive coupling element 150 is positioned over a clockwise winding portion 130 of the first planar sensing coil 115, while the counter-clockwise winding portion 140 and the winding portions 135, 145 of the second planar sensing coil 125 are covered by the rotatable inductive coupling element 150.

Figure 5B:
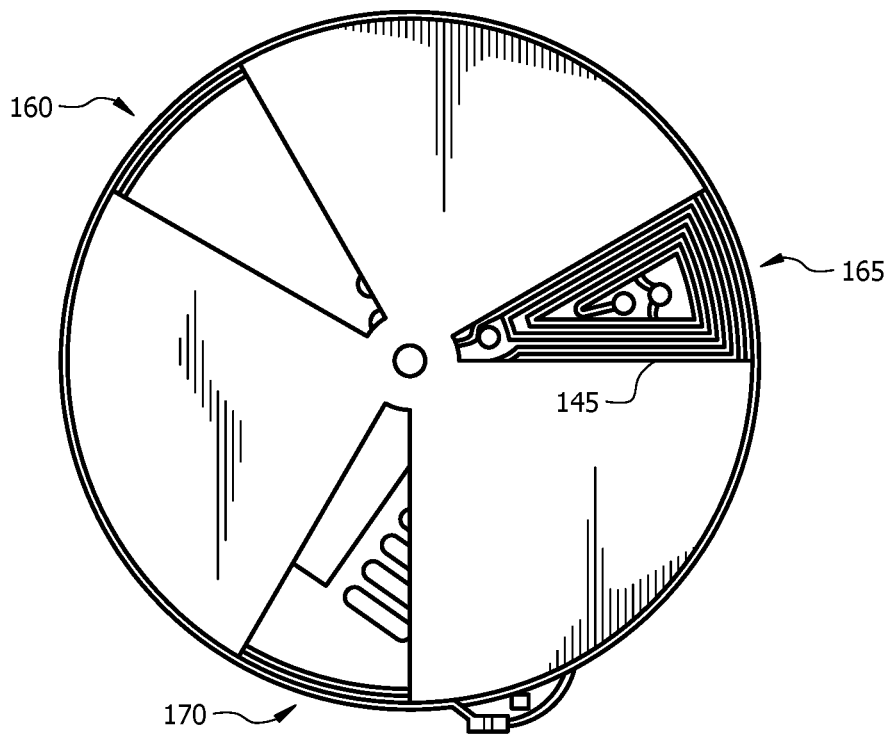
FIG. 5B is a diagram illustrating the angular position sensor in a 30° angular rotation position, in accordance with an embodiment of the present invention.

In FIG. 5B, when the rotatable inductive coupling element 150 is rotated counter-clockwise to a 30° position, a second sector aperture 165 of the rotatable inductive coupling element 150 is positioned over the counter-clockwise winding portion 145 of the second planar sensing coil 125, while the clockwise winding portion 135 and the winding portions 130, 140 of the first planar sensing coil 115 are covered by the rotatable inductive coupling element 150.

Figure 5C:
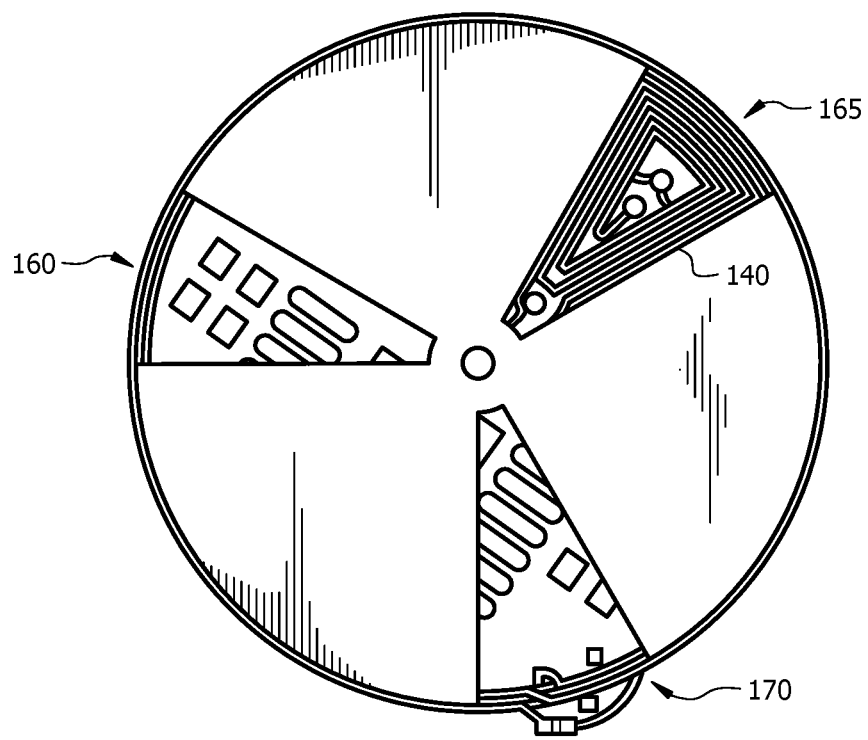
FIG. 5C is a diagram illustrating the angular position sensor in a 60° angular rotation position, in accordance with an embodiment of the present invention.

In FIG. 5C, when the rotatable inductive coupling element 150 is rotated counter-clockwise to a 60° position, the second sector aperture 165 is then positioned over the counter-clockwise winding portion 140 of the first planar sensing coil 115, while the clockwise winding portion 130 and the winding portions 135, 145 of the second planar sensing coil 125 are covered by the rotatable inductive coupling element 150.

Figure 5D:
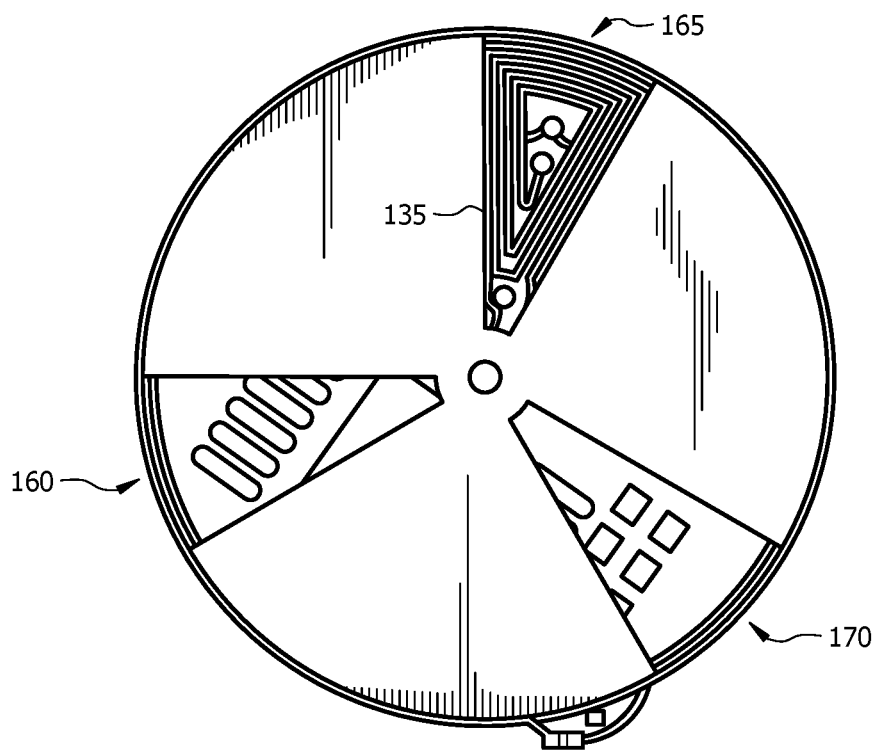
FIG. 5D is a diagram illustrating the angular position sensor in a 90° angular rotation position, in accordance with an embodiment of the present invention.

In FIG. 5D, when the rotatable inductive coupling element 150 is rotated counter-clockwise to a 90° position, second sector aperture 165 of the rotatable inductive coupling element 150 is positioned over the clockwise winding portion 135 of the second planar sensing coil 125, while the counter-clockwise winding portion 145 and the winding portions 130, 140 of the first planar sensing coil 115 are covered by the rotatable inductive coupling element 150.

As the rotatable inductive coupling element 160 is rotated through each of the positions shown in FIG. 5A-FIG. 5D, the time varying voltage induced in each of the first and second planar sensing coils 115, 125 is measured by the voltage sensing circuitry 405. In this exemplary embodiment, the voltages measured by the voltage sensing circuitry 405 are sine and cosine functions of the angle of rotation of the sector apertures 160, 165 of the rotatable inductive coupling element 150 relative to the angular position sensor 100. When the sector aperture 160 is positioned as in FIG. 5A, the time varying magnetic field is attenuated above the clockwise winding portion 135 and the counter-clockwise winding portion 145 of the second planar sensing coil 125 and above the counter-clockwise winding portion 140 of the first planar sensing coil 115, but the time varying magnetic field is not attenuated above the clockwise winding portion 130 of the first planar sensing coil 115. As such, the time varying voltage induced in the counter-clockwise winding portion 140 of the first planar sensing coil 115 is different than the time varying voltage induced in the clockwise winding portion 130 of the first planar sensing coil 115. This difference in the induced voltage is measured by the voltage sensing circuitry 405. The voltage sensing circuitry 405 additionally determines a ratio of a magnitude of the measured time varying voltage of the first planar sensing coil 115 to a magnitude of the measured time varying voltage of the second planar sensing coil 125 to determine the angular position of the rotatable inductive coupling element 150 relative to the position of the first planar sensing coil 115 and the second planar sensing coil 125. The above has been described in some detail in relation to the sector aperture 160 positioned as in FIG. 5A, it being understood that similar changes in time varying voltage can be described for the positioning shown in each of FIGS. 5B-5D.

Figure 5E:
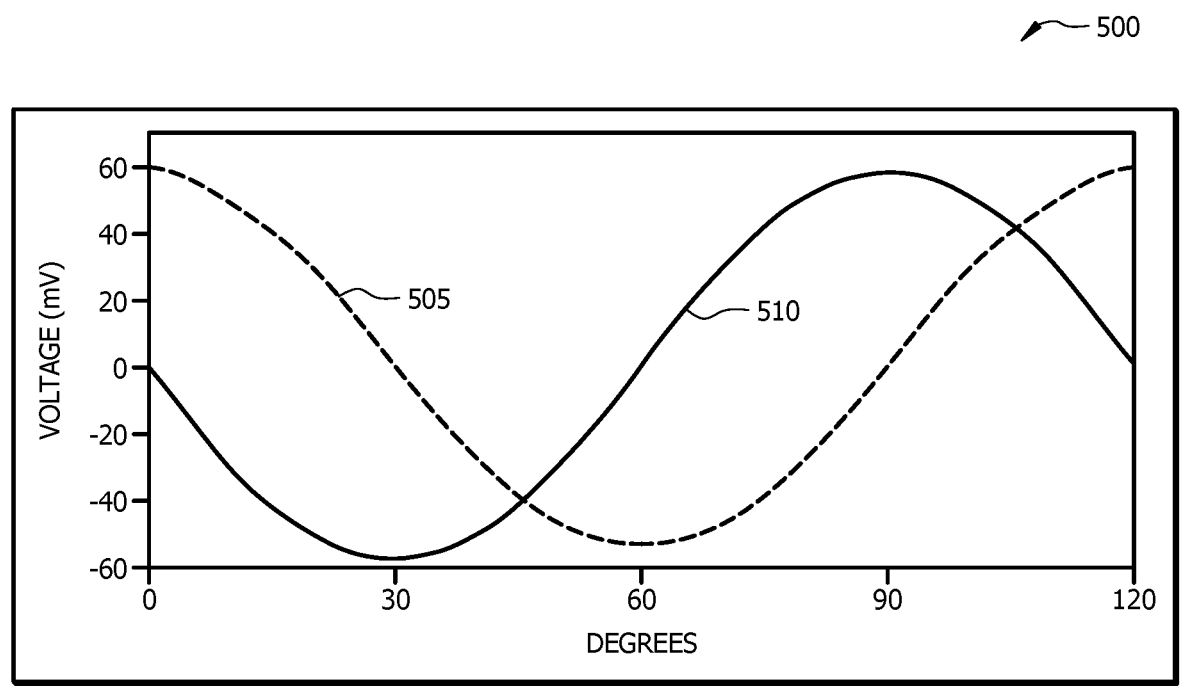
FIG. 5E is a graphical illustration of the voltage magnitude variation of the two planar sensing coils with respect to position of the rotatable inductive coupling element, in accordance with an embodiment of the present invention.

As shown in the graph 500 of FIG. 5E, with the position of the sector aperture 160 as shown in FIG. 5A considered as the zero rotation reference point, the net voltage 510 induced in the clockwise winding portion 135 and counter-clockwise winding portion 145 of the second planar sensing coil 125 is zero because both of the winding portions of the second planar sensing coil 125 are covered by the rotatable inductive coupling element 150. However, the net voltage 505 induced in the first planar sensing coil 115 is at a peak value because the clockwise winding portion 130 of the first planar sensing coil 115 is not covered at all by the rotatable inductive coupling element 150 and the counter-clockwise winding portion 140 is completely covered by the rotatable inductive coupling element 150. The peak value of the sine and cosine functions of the time varying voltage of the first and second planar sensing coils 115, 125 is dependent upon the airgap 120 between the winding portions of the first and second planar sensing coils 115, 125 and the rotatable inductive coupling element 150, the number of winding turns of the two planar excitation coils 105, 110 and the number of winding turns of the first and second planar sensing coils 115, 125.

In general, the graph 500 of FIG. 5E illustrates the voltage magnitude variation of the first planar sensing coil 115 and the second planar sensing coil 125 with respect to the position of the sector apertures 160, 165, 170 of the rotatable inductive coupling element 150. The voltage magnitude variation is sensed by the voltage sensing circuitry 405 and the measurements may be further processed to provide the target angular position. For example, if the magnitude of the voltage 505 of the first planar sensing coil 115 is measured as a zero voltage and the magnitude of the voltage 510 of the second planar sensing coil 125 is measured as a negative peak voltage, in can be determined from a comparison of the measured voltages that the angular position of the rotatable inductive coupling element 150 is at 30°, which is equivalent to the configuration illustrated in FIG. 5B. Additionally, the graph illustrates the voltage magnitude of the first planar sensing coil 115 and the second planar sensing coil 125 between the 0°, 30°, 60° and 90° positions of the rotatable inductive coupling element 150. Between the 0°, 30°, 60° and 90° positions of the rotatable inductive coupling element 150, one or more of the winding portions 130, 135, 140, 145 of the first and second planar sensing coils 115, 125 may only be partially covered by one of the sector apertures 160, 165, 170 of the rotatable inductive coupling element 150, thereby resulting in sensed voltage magnitudes between the maximum and minimum magnitudes, as shown.

FIG. 6 is a flow diagram of a method 600 for sensing an angular position of a rotatable inductive coupling element, in accordance with an embodiment of the present invention.

At operation 605, the method includes, establishing a magnetic coupling between two planar excitation coils and two planar sensing coils to induce a time varying voltage in the two planar sensing coils, wherein the two planar sensing coils are positioned within a minor sector of a substantially circular interior area formed by the two planar excitation coils and wherein each of the two planar sensing coils comprises a clockwise winding portion positioned opposite a counter-clockwise winding portion. With reference to FIG. 1 and FIG. 2, in the present invention a magnetic coupling is established between two planar excitation coils 105, 110 and first and second planar sensing coils 115, 125 positioned in an interior of the two planar excitation coils 105, 110 to induce a time varying voltage in the first and second planar sensing coil 115, 125, wherein each of the first and second planar sensing coils 115, 125 comprise a respective clockwise winding portion and a respective counter-clockwise winding portion.

At operation 610, the method includes, positioning a rotatable inductive coupling element comprising three sector apertures that are substantially evenly spaced on the circular rotatable inductive coupling element in overlying relation to the two planar excitation coils and separated from the two planar excitation coils by an airgap, the position of the sector apertures of the rotatable inductive coupling element to cause a variation in a magnetic coupling between the two planar excitation coils and the winding portions of each of the two planar sensing coils. With reference to FIG. 1 and FIG. 2, in the present invention rotatable inducting coupling element 150 comprising the sector apertures 160, 165, 170 is positioned in overlying relation to the two planar excitation coils 105, 110 and separated from the first and second planar sensing coils 115, 125 by airgap 120 to cause a variation in a magnetic coupling between the two planar excitation coils 105, 110 and the winding portions 130, 135, 140, 145 of the two planar sensing coils 115, 125 over which the sector apertures 160, 165, 170 of the rotatable inductive coupling element 150 are not substantially aligned. Preferably, the rotatable inductive coupling element is fabricated of, i.e. comprises, non-ferromagnetic conductive material.

At operation 615, the method includes, measuring a time varying voltage induced in the two planar sensing coils as a result of the variation in the magnetic coupling. With reference to FIG. 1 and FIG. 4A-FIG. 4C, in the present invention, the voltage sensing circuit 405 is used to measure a time varying voltage induced in the two planar sensing coils 115, 125 as a result of the variation in the magnetic coupling between the two planar excitation coils 105, 110 and the winding portions 130, 135, 140, 145 of the two planar sensing coils 115, 125.

At operation 620, the method includes, determining a ratio of the measured time varying voltage of each of the two planar sensing coils to determine the angular position of the rotatable inductive coupling element relative to the position of the two planar sensing coils. With reference to FIG. 1 and FIG. 4A-FIG. 4C, in the present invention, the voltage sensing circuitry 405 determines an angular position of the rotatable inductive coupling element 150 relative to the position of the two planar sensing coils 115, 125.

The system and method of the present invention provides an improved, non-contact, inductive, angular position sensor which utilizes a planar coil assembly that can be implemented on a multilayer printed circuit board (PCB) to provide improved accuracy and allow for a larger airgap.

In one embodiment, portions of the angular position sensor may be implemented in an integrated circuit as a single semiconductor die. Alternatively, the integrated circuit may include multiple semiconductor die that are electrically coupled together such as, for example, a multi-chip module that is packaged in a single integrated circuit package.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, microcontroller or general-purpose computer.

Unless specifically stated otherwise as apparent from the discussion, it is appreciated that throughout the description, discussions utilizing terms such as "measuring", "determining", "generating", "applying", "sending", "encoding", "locking", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What we claim is:

1. An angular position sensor comprising:
   two planar excitation coils forming a substantially circular interior area;
   two planar sensing coils positioned within a minor sector of the substantially circular interior area, the minor sector comprising four equal subsectors, each of the two planar sensing coils comprising a clockwise winding portion and a counter-clockwise winding portion and each of the clockwise winding portions and counter-clockwise winding portions positioned in one of the four equal subsectors of the minor sector; and
   a substantially circular rotatable inductive coupling element positioned in overlying relation to the two planar sensing coils and separated from the two planar sensing coils by an airgap, wherein the substantially circular rotatable inductive coupling element comprises three sector apertures that are substantially evenly spaced on the circular rotatable inductive coupling element.

2. The angular position sensor of claim 1, wherein each of the sector apertures of the substantially circular rotatable inductive coupling element has dimensions substantially equal to one of the four equal subsectors of the minor sector of substantially circular interior area formed by the two planar excitation coils.

3. The angular sensor of claim 1, wherein the rotatable inductive coupling element is a rotatable conductive disk having a radius that is substantially equal to a radius of the two planar excitation coils.

4. The angular position sensor of claim 1, wherein the rotatable inductive coupling element is comprised of a non-ferromagnetic conductive material.

5. The angular position sensor of claim 1, wherein the minor sector of the substantially circular interior area has a central angle of about 120° and each of the three sector apertures of the substantially circular rotatable inductive coupling element has a central angle of about 30°.

6. The angular position sensor of claim 1, wherein each of the four equal subsectors of the minor sector has a central angle of about 30°.

7. The angular position sensor of claim 1, wherein the clockwise winding portion and the counter-clockwise winding portion of each of the two planar sensing coils are positioned in alternating subsectors of the minor sector.

8. The angular position sensor of claim 1, wherein each of the clockwise winding portion and the counter-clockwise winding portion of the two planar sensing coils comprises a plurality of winding turns and wherein a number of winding turns of the clockwise winding portion is equal to a number of winding turns of the counter-clockwise winding portion of each of the two planar sensing coils.

9. The angular position sensor of claim 1, wherein each of the two planar excitation coils comprises a plurality of winding turns.

10. The angular position sensor of claim 1, further comprising a multilayer substrate and wherein each of the two planar excitation coils are positioned on a different layers of the multilayer substrate.

11. The angular position sensor of claim 1, further comprising a multilayer substrate and wherein each of the clockwise winding portion and the counter-clockwise winding portion of each of the two planar sensing coils are positioned on a different layer of the multilayer substrate.

12. The angular position sensor of claim 1, further comprising a DC voltage source coupled to the two planar excitation coils.

13. The angular position sensor of claim 1, further comprising a capacitor coupled to each of the two planar excitation coils, the two planar excitation coils and the capacitors forming a cross-coupled resonant tank circuit.

14. The angular sensor of claim 1, further comprising voltage sensing circuitry coupled to each of the two planar sensing coils.

15. An angular position sensor comprising:
two planar excitation coils forming a substantially circular interior area;
two planar sensing coils positioned within a minor sector of the substantially circular interior area, the minor sector having a central angle of about 120° and each of the two planar sensing coils comprising a clockwise winding portion and a counter-clockwise winding portion, wherein each of the clockwise winding portion and the counter-clockwise winding portion are positioned within one of four equal subsectors of the minor sector of the substantially circular interior area and wherein each of the four equal subsectors of the minor sector has a central angle of about 30°; and
a substantially circular non-ferromagnetic coupling element positioned in overlying relation to the two planar sensing coils and separated from the two planar sensing coils by an airgap, wherein the substantially circular rotatable inductive coupling element comprises three sector apertures that are substantially evenly spaced on the circular rotatable inductive coupling element, each sector aperture having a central angle of about 30°.

16. A method for sensing an angular position of a rotatable inductive coupling element, the method comprising:
establishing a magnetic coupling between two planar excitation coils and two planar sensing coils to induce a time varying voltage in the two planar sensing coils, wherein the two planar sensing coils are positioned within a minor sector of a substantially circular interior area formed by the two planar excitation coils and wherein each of the two planar sensing coils comprises a clockwise winding portion positioned opposite a counter-clockwise winding portion;
positioning a rotatable inductive coupling element comprising three sector apertures that are substantially evenly spaced on the circular rotatable inductive coupling element in overlying relation to the two planar excitation coils and separated from the two planar excitation coils by an airgap, the position of the sector apertures of the rotatable inductive coupling element to cause a variation in a magnetic coupling between the two planar excitation coils and the winding portions of each of the two planar sensing coils responsive to rotation of the positioned rotatable inductive coupling element; and
measuring a time varying voltage induced in the two planar sensing coils as a result of the variation in the magnetic coupling to determine an angular position of the rotatable inductive coupling element relative to the position of the two planar sensing coils.

17. The method of claim 16, further comprising rotating the rotatable inductive coupling element to at least partially position one of the sector apertures over at least one of the winding portions of the two planar sensing coils to cause the variation in the magnetic coupling between the two planar excitation coils and the at least one winding portion.

18. The method of claim 16, wherein measuring the time varying voltage induced in the two planar sensing coils as a result of the variation in the magnetic coupling to determine the angular position of the rotatable inductive coupling element relative to the position of the two planar sensing coils further comprises:
measuring the time varying voltage of each of the two planar sensing coils; and
determining a ratio of the magnitudes of the measured time varying voltage of each of the two planar sensing coils to determine the angular position of the rotatable inductive coupling element relative to the position of the two planar sensing coils.

19. The method of claim 16, wherein the minor sector of the substantially circular interior area has a central angle of about 120° and each sector aperture of the substantially circular rotatable inductive coupling element has a central angle of about 30°.

20. The method of claim 16, wherein each of the clockwise winding portion and the counter-clockwise winding portion of each of the two planar sensing coils are positioned within one of four equal subsectors of the minor sector of the substantially circular interior area and wherein each of the four equal sub sectors of the minor sector has a central angle of about 30°.

* * * * *